(12) United States Patent
King

(10) Patent No.: US 6,242,692 B1
(45) Date of Patent: Jun. 5, 2001

(54) ELECTRIC POWER CABLES

(75) Inventor: Stephen Maurice King, Sevenoaks (GB)

(73) Assignee: Pirelli Cables (2000) Limited, London (GB)

( * ) Notice: Subject to any disclaimer, the term of this patent is extended or adjusted under 35 U.S.C. 154(b) by 0 days.

(21) Appl. No.: 09/230,656

(22) PCT Filed: Sep. 9, 1998

(86) PCT No.: PCT/GB98/02707

§ 371 Date: Apr. 21, 1999

§ 102(e) Date: Apr. 21, 1999

(87) PCT Pub. No.: WO99/13478

PCT Pub. Date: Mar. 18, 1999

(30) Foreign Application Priority Data

Sep. 11, 1997 (GB) .................................................. 9719253

(51) Int. Cl.$^7$ ........................................................ H01B 7/34
(52) U.S. Cl. .................. 174/36; 174/106 R; 174/120 SC
(58) Field of Search .......................... 174/102 R, 105 R, 174/106 R, 105 SC, 106 SC, 120 SC, 36, 23 R, 102 SC, 120 R

(56) References Cited

U.S. PATENT DOCUMENTS

| | | |
|---|---|---|
| Re. 36,307 | 9/1999 | Marin et al. . |
| 3,321,572 | 5/1967 | Garner . |
| 4,125,739 * | 11/1978 | Bow ........................................ 174/36 |
| 4,533,789 * | 8/1985 | Katz ...................................... 174/102 R |
| 4,703,134 | 10/1987 | Uematsu . |
| 4,731,504 | 3/1988 | Achill et al. . |
| 4,986,372 * | 1/1991 | Ganssle .......................... 174/106 SC |
| 5,010,209 * | 4/1991 | Marciano-Agostinelli et al. .. 174/23 R |
| 5,043,538 | 8/1991 | Hughey, Jr. et al. . |
| 5,082,719 | 1/1992 | Arroyo . |
| 5,146,046 | 9/1992 | Arroyo et al. . |
| 5,170,010 | 12/1992 | Aldissi . |
| 5,249,248 | 9/1993 | Arroyo et al. . |
| 5,281,757 | 1/1994 | Marin et al. . |
| 5,293,001 * | 3/1994 | Gebs ....................................... 174/36 |
| 5,300,733 | 4/1994 | Uematsu . |
| 5,373,100 | 12/1994 | Arroyo et al. . |
| 5,486,648 | 1/1996 | Chan et al. . |
| 5,614,269 | 3/1997 | Hoskins . |
| 5,756,159 | 5/1998 | Hoskins et al. . |

FOREIGN PATENT DOCUMENTS

| | | |
|---|---|---|
| 209899 | 9/1991 | (EP) . |
| 1485130 | 6/1966 | (FR) . |
| 2465301 | 9/1979 | (FR) . |
| WO 98/14960 | 4/1998 | (WO) . |

* cited by examiner

Primary Examiner—Dean A. Reichard
Assistant Examiner—Chau N. Nguyen
(74) Attorney, Agent, or Firm—Blank Rome Comisky & McCauley

(57) ABSTRACT

An electric power cable of the kind having at least one metallic conductor, optionally a conductor screen of semi-conductive material, and insulation all enclosed in an earth screen formed by wires or narrow tapes and a sheath formed by polymeric material is characterised by a sheath construction including a first extruded polymeric layer which encloses the earth screen of the cable without filling the gaps between the components thereof (the wires or strips), a second extruded polymeric layer enclosing the first and between them a moisture barrier laminate having a metal foil layer coated on one of its major faces with a polymeric material compatible with the material of the extruded layer it contacts and bonded to that extruded layer only. That increases the resistance of the cable to impact, compared with constructions in which a moisture barrier foil layer is applied directly over the screen wires, and increases flexibility and reduces cost compared with constructions in which the foil is bonded to both extruded layers.

23 Claims, 1 Drawing Sheet

ELECTRIC POWER CABLES

BACKGROUND OF THE INVENTION

This invention relates to electric power cables of the kind having at least one metallic conductor, usually a conductor screen of semiconductive material, and insulation all enclosed in an earth screen comprising wires or narrow tapes and an external sheath comprising polymeric material which will usually (but not necessarily) form the exposed surface of the cable.

In most environments, it is desirable, if not essential, that the sheath is more effectively watertight than can be achieved with polymeric material alone, and attempts have thus been made to follow the practice used in communications cables of including a metal/plastics laminate foil beneath the main body of the sheath, so as to become bonded to it, normally when the main polymeric body is extruded. It is difficult, with such structures, to design a sheath in which the laminate foil remains intact when the cable is subjected to the impact tests specified by Standards Authorities and customers, as the laminate tends to be driven into the gaps between the wires or tapes of the screen and to split along resulting crease lines.

In our prior application GB9620394.8 which is related to WO98/14960 and U.S. Ser. No. 09/230,565 cable characterised by a sheath construction comprising a first extruded polymeric layer which encloses the earth screen of the cable without filling the gaps between the components thereof (the wires or strips), a second extruded polymeric layer enclosing the first and between them and bonded to both of them a moisture barrier laminate comprising a metal foil layer coated on each of its major faces with a polymeric material compatible with the material of the extruded layer it contacts.

Surprisingly, we have now discovered that it is possible to achieve adequate performance in impact tests in a similar construction with the moisture barrier foil bonded to only one of the two extruded layers. This offers an improvement in flexibility as well as an appreciable cost saving (as the foil needs to be coated on only one face), though there is some diminution of longitudinal water-blocking effect.

SUMMARY OF INVENTION

The cable in accordance with the present invention is thus characterised by a sheath construction comprising a first extruded polymeric layer which encloses the earth screen of the cable without filling the gaps between the components thereof (the wires or strips), a second extruded polymeric layer enclosing the first and between them a moisture barrier laminate comprising a metal foil layer coated on one of its major faces with a polymeric material compatible with the material of the extruded layer it contacts and bonded to that extruded layer only.

Preferably the metal foil layer is coated on only one face, and this is normally sufficient of itself to prevent adhesion to the other extruded layer of the sheath, but as an additional precaution (or instead) a suitable parting agent may be applied to one or both of the surfaces that it is desired should not bond. Graphite applied from aqueous suspension is preferred as parting agent, but talc ("chalk") or a suitable oil might be used in some cases.

Preferably the foil is bonded to the outer extruded layer of the sheath and prevented from bonding to the inner layer.

Preferably the extruded polymeric layer to which the foil is to be bonded is of the same polymeric material as the coating on the foil; the other may but need not be of a substantially different composition. Options include the usual cable sheathing materials, namely polyethylene, polyvinyl chloride, "LSF" compositions based on ethylenevinyl acetate copolymer and ethylene-propylene rubbers (in each case with conventional additives).

The laminate is preferably longitudinally applied, but could be helically lapped if desired.

Preferably the insulation of the cable is of a polymeric material, such as crosslinked polyethylene or ethylenepropylene rubber, and in this case the conductor screen is preferably of carbon-loaded polymeric material and the earth screen preferably includes an inner layer of carbon-loaded conductive polymeric material, in addition to the wires or strips of metal.

Preferably the gaps between the wires or strips of the earth screen are waterblocked by applying water-swellable tapes under and/or over them, or in other known ways. Preferably at least one semiconductive water-swellable tape is applied under the wires or tapes and at least one insulating water-swellable tape over the top of them. A waterblocking tape applied over the wires or tapes may facilitate ensuring that the first extruded layer of the sheath does not fill the gaps between them. Other suitable tapes could be used for this purpose if desired.

BRIEF DESCRIPTION OF THE DRAWINGS

The invention will be further described, by way of example, with reference to the accompanying drawings in which.

DETAILED DESCRIPTION OF PREFERRED EMBODIMENT

Figure 1:
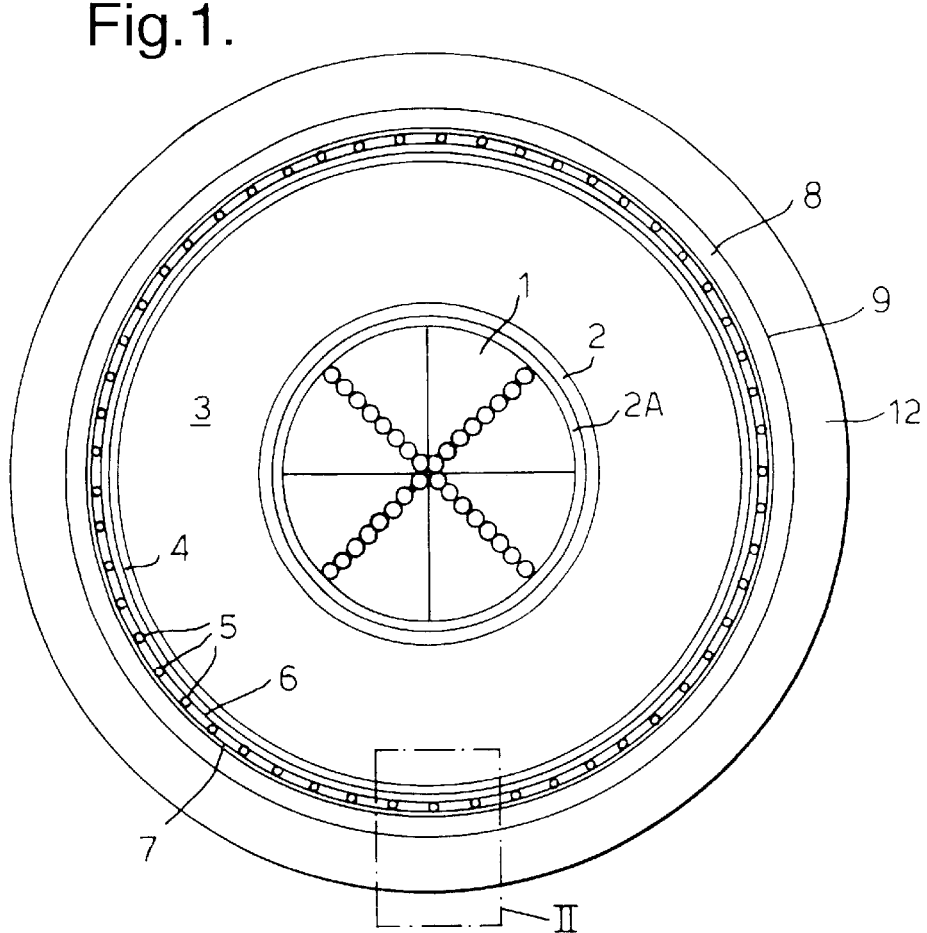
FIG. 1 is a diagrammatic cross-section of one form of single-core cable in accordance with the invention and FIG. 2 is an enlargement of the portion of FIG. 1 enclosed by the box II.
Figure 2:
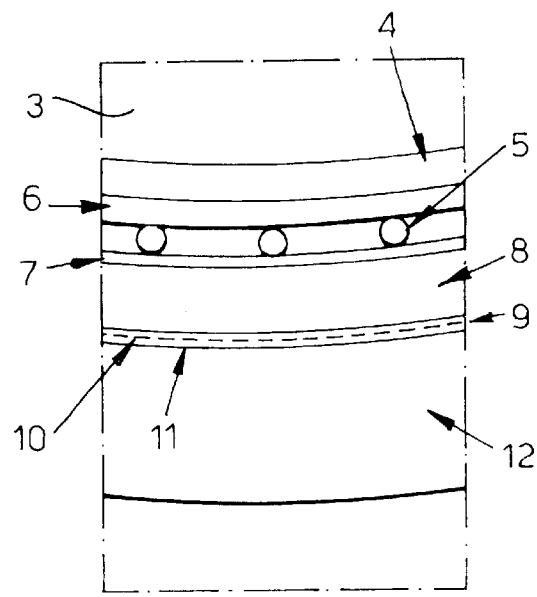

The cable of the example has a stranded plain annealed copper conductor 1, a semiconductive conductor screen 2 applied over a binder tape 2A, crosslinked polyethylene insulation 3 and a dielectric screen comprising an inner semiconducting layer 4 (which may be "fully bonded" or "strippable") and a layer of copper wires 5, all of which are conventional. A semiconducting water-swellable tape 6 under the wires and an insulating water-swellable tape 7 over them provide longitudinal water-blocking for the gaps between the wires. In accordance with the invention, this conventional part of the cable 1 is enclosed in a sheath comprising a first extruded layer of polyethylene 8, a longitudinally applied tape 9 with a base layer 10 of aluminum coated on only one side, applied outwards, with polyethylene 11, and a second extruded layer of polyethylene 12. The conditions and die dimensions for the extrusion of the first layer of the sheath are such that the layer is "tubed" and does not embed the wires of the screen to any substantial extent. The temperature at which this second layer is applied is high enough to ensure that the laminate is adhesively bonded to the second polyethylene layer but, in the absence of a coating on the inside, it does not bond to any significant extent to the first layer.

In a particular example constructed as just described, a copper conductor of 300 $mm^2$ (made up of 59 round wires each 2.6 mm in diameter) is covered with a conventional semiconducting screen material to a nominal radius of 25.3 mm. The crosslinked polyethylene insulation has a radial thickness of 18.9 mm and a tensile strength of 17 MPa measured according to ISO 527 in the fully-crosslinked state using an extension rate of 250 mm/min and the screen comprises a layer 1.0 mm thick of a conventional fully-bonded screen composition and 69 soft annealed copper wires each 1.78 mm in diameter. The inner and outer layer of the sheath have thickness of 2.9 mm and 7.4 mm respectively and both are made of a thermoplastic polyethylene cable-sheathing composition with a tensile strength of 20 MPa measured according to ASTM D638, while the laminate has an aluminium base layer 0.2 mm thick and a coating of polyethylene 0.050 mm thick on one side; it is 230 mm wide and applied longitudinally with the coating outwards and so that its edges overlap by a minimum of 5 mm. This cable reliably passes the impact test specified by CIGRE specification WG 21.14 (Elektra no.141, April 1992) using an impacting weight of 5 kg in the form of a 90° wedge with 2 mm tip radius dropped from a height of a metre.

What is claimed is:

1. An electric power cable of the type having at least one metallic conductor, a conductor screen of semiconductive material, and insulation, and an earth screen enclosing the conductor, conductor screen and insulation, the earth screen having wires with gaps therebetween, the electric power cable comprising an external sheath including a first extruded polymeric layer which encloses the earth screen of the cable without filling the gaps, a second extruded polymeric layer enclosing the first polymeric layer and a moisture barrier laminate located between the first and second polymeric layers, said moisture barrier laminate including a metal foil layer and a polymeric material coating on at least one surface of the metal foil layer, the polymeric material contacting one of the first and second extruded polymeric layers and compatible with a material of the contacted one of the first and second extruded polymeric layers and bonded to the contacted one of the first and second extruded polymeric layers only.

2. The cable as claimed in claim 1 in which the polymeric material is coated on only one surface of the metal foil layer.

3. The cable as claimed in claim 2 in which a parting agent is applied to one or both of the surfaces of the metal foil layer that are not bonded.

4. The cable as claimed in claim 1 in which a parting agent is applied to one surface of the moisture barrier laminate that is not bonded.

5. The cable as claimed in claim 1 in which the metal foil layer is bonded to the second extruded layer of the external sheath and not to the first extruded layer.

6. The cable as claimed in claim 1 in which the moisture barrier laminate is longitudinally applied.

7. The cable as claimed in claim 1 in which the insulation of the cable is of a polymeric material.

8. The cable as claimed in claim 1 in which the gaps between the wires of the earth screen are waterblocked.

9. The cable as claimed in claim 1 in which the gaps between the wires of the earth screen are waterblocked by applying water-swellable tapes under or over the wires.

10. The cable as claimed in claim 9 in which said water-swellable tapes include at least one semiconductive water-swellable tape applied under the wires and at least one insulating water-swellable tape applied over the top of the wires.

11. The cable of claim 1, wherein the polymeric material contacts the second extruded layer and a second surface of the metal foil layer contacts the first extruded layer.

12. The cable of claim 1, the metal foil layer having a second surface contacting the other one of the first and second extruded layer, but not being bonded to that layer.

13. An electric power cable of the type having at least one metallic conductor, a conductor screen of semiconductive material, an insulation, and an earth screen enclosing the conductor, conductor screen and insulation, the earth screen having tape strips with gaps therebetween, the electric power cable comprising an external sheath including first extruded polymeric layer which encloses the earth screen of the cable without filling the gaps, a second extruded polymeric layer enclosing the first polymeric layer and a moisture barrier laminate located between the first and second polymeric layers, said moisture barrier laminate including a metal foil layer and a polymeric material coated on at least one surface of the metal foil layer, the polymeric material contacting one of the first and second extruded layers and compatible with the material of the contacted extruded layer and bonded only to the contacted extruded layer.

14. The cable as claimed in claim 13 in which the polymeric material is coated on only one surface of the metal foil layer.

15. The cable as claimed in claim 13 in which a parting agent is applied to one surface of the moisture barrier laminate that is not bonded.

16. The cable as claimed in claim 13 in which the metal foil layer is bonded to the second extruded layer of the external sheath and not to the first extruded layer.

17. The cable as claimed in claim 13 in which the moisture barrier laminate is longitudinally applied.

18. The cable as claimed in claim 13 in which the insulation of the cable is polymeric.

19. The cable as claimed in claim 13 in which the gaps between the tape strips of the earth screen are waterblocked.

20. The cable as claimed in claim 13 in which the gaps between the tape strips of the earth screen are waterblocked by applying water-swellable tapes under or over the tape strips.

21. The cable as claimed in claim 20 wherein the water-swellable tapes include at least one semiconductive water-swellable tape applied under the tape strips and at least one insulating water-swellable tape applied over the top of the tape strips.

22. The cable of claim 13, wherein the polymeric material contacts the second extruded layer and a second surface of the metal foil layer contacts the first extruded layer.

23. The cable of claim 13, the metal foil layer having a second surface contacting the other one of the first and second extruded layer, but not being bonded to that layer.

* * * * *